United States Patent
Lin et al.

(10) Patent No.: US 9,525,658 B2
(45) Date of Patent: *Dec. 20, 2016

(54) SYNCHRONOUS COMMUNICATION SYSTEM AND METHOD

(71) Applicant: Google Inc., Mountain View, CA (US)

(72) Inventors: Jennifer W. Lin, San Jose, CA (US); Kaisuke Nakajima, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,004

(22) Filed: Feb. 15, 2016

(65) Prior Publication Data

US 2016/0164822 A1    Jun. 9, 2016

Related U.S. Application Data

(63) Continuation of application No. 13/427,125, filed on Mar. 22, 2012, now Pat. No. 9,264,390.

(51) Int. Cl.
 *G06F 15/16*  (2006.01)
 *H04L 12/58*  (2006.01)
 *H04L 29/06*  (2006.01)

(52) U.S. Cl.
 CPC .............. *H04L 51/32* (2013.01); *H04L 65/403* (2013.01)

(58) Field of Classification Search
None
See application file for complete search history.

(56) References Cited

U.S. PATENT DOCUMENTS

| | | |
|---|---|---|
| 7,801,971 B1 | 9/2010 | Amidon et al. |
| 8,069,142 B2 | 11/2011 | Davis et al. |
| 8,281,027 B2 | 10/2012 | Martinez et al. |
| 8,402,094 B2 | 3/2013 | Bosworth et al. |
| 8,452,855 B2 | 5/2013 | Higgins et al. |
| 8,489,442 B1 | 7/2013 | Mohler |
| 8,527,287 B1 | 9/2013 | Bhatia |
| 8,769,012 B1 | 7/2014 | Shah et al. |
| 8,781,841 B1 | 7/2014 | Wang |
| 2002/0075303 A1 | 6/2002 | Thompson et al. |
| 2002/0075304 A1 | 6/2002 | Thompson et al. |
| 2005/0216848 A1 | 9/2005 | Thompson et al. |

(Continued)

OTHER PUBLICATIONS

USPTO, Notice of Allowance for U.S. Appl. No. 13/730,499, Nov. 16, 2015, 7 pages.

(Continued)

*Primary Examiner* — Brian P Whipple
(74) *Attorney, Agent, or Firm* — IP Spring (57) ABSTRACT

A method, computer program product, and computing system for providing a plurality of users of a social network with the ability to indicate affinity with an electronic object. An indication is received from a first user of the plurality of users to initiate an object-specific, synchronous communication session concerning the electronic object. Electronic invitations to join the object-specific, synchronous communication session are provided to one or more invited users of the plurality of users of the social network. A request is received, from at least one of the invited users, to join the object-specific, synchronous communication session. The object-specific, synchronous communication session is provided for the first user and the at least one of the invited users.

20 Claims, 4 Drawing Sheets

(56) References Cited

U.S. PATENT DOCUMENTS

| | | |
|---|---|---|
| 2005/0289471 A1 | 12/2005 | Thompson et al. |
| 2006/0117264 A1 | 6/2006 | Beaton et al. |
| 2007/0192410 A1 | 8/2007 | Liversidge et al. |
| 2009/0106040 A1 | 4/2009 | Jones |
| 2009/0119603 A1 | 5/2009 | Stackpole |
| 2010/0138492 A1 | 6/2010 | Guzman et al. |
| 2010/0205541 A1 | 8/2010 | Rapaport et al. |
| 2010/0238919 A1 | 9/2010 | Froelich |
| 2011/0004831 A1* | 1/2011 | Steinberg ............. H04N 21/454 715/753 |
| 2011/0010641 A1 | 1/2011 | Wolff et al. |
| 2011/0161987 A1 | 6/2011 | Huang et al. |
| 2011/0208822 A1 | 8/2011 | Rathod |
| 2011/0288884 A1 | 11/2011 | Algoo et al. |
| 2011/0289156 A1 | 11/2011 | Pirnazar |
| 2011/0289157 A1 | 11/2011 | Pirnazar |
| 2011/0296506 A1 | 12/2011 | Caspi |
| 2011/0302105 A1 | 12/2011 | Yakubov |
| 2012/0004956 A1* | 1/2012 | Huston ............... G06Q 30/0207 705/14.1 |
| 2012/0030193 A1 | 2/2012 | Richberg et al. |
| 2012/0089470 A1 | 4/2012 | Barnes, Jr. |
| 2012/0096490 A1 | 4/2012 | Barnes, Jr. |
| 2012/0110085 A1 | 5/2012 | Malik et al. |
| 2012/0117153 A1 | 5/2012 | Gunasekar et al. |
| 2012/0166532 A1 | 6/2012 | Juan et al. |
| 2012/0179980 A1 | 7/2012 | Whalin et al. |
| 2012/0188330 A1 | 7/2012 | Turner |
| 2012/0233548 A1 | 9/2012 | Zinn |
| 2012/0275583 A1 | 11/2012 | Katis et al. |
| 2012/0288074 A1 | 11/2012 | Katis et al. |
| 2012/0290950 A1 | 11/2012 | Rapaport et al. |
| 2013/0124322 A1 | 5/2013 | Boland et al. |
| 2013/0143539 A1 | 6/2013 | Baccay et al. |
| 2013/0159110 A1 | 6/2013 | Rajaram et al. |
| 2013/0173712 A1* | 7/2013 | Monjas Llorente ... G06Q 10/00 709/204 |
| 2013/0176895 A1 | 7/2013 | McEachern et al. |
| 2013/0179518 A1 | 7/2013 | Quan |
| 2013/0211868 A1 | 8/2013 | DeLuca |
| 2013/0218982 A1 | 8/2013 | Hymel et al. |
| 2013/0329865 A1 | 12/2013 | Ristock et al. |
| 2014/0089418 A1* | 3/2014 | Davenport ............. H04L 51/32 709/206 |
| 2014/0172967 A1 | 6/2014 | Yeung et al. |
| 2014/0282016 A1* | 9/2014 | Hosier, Jr. ............. H04W 4/08 715/733 |
| 2015/0312204 A1* | 10/2015 | Shaffer ................. H04L 12/588 709/206 |

OTHER PUBLICATIONS

USPTO, Non-Final Rejection for U.S. Appl. No. 13/730,499, Dec. 18, 2014, 35 pages.

USPTO, Non-Final Rejection for U.S. Appl. No. 13/427,125, Jun. 11, 2015, 12 pages.

USPTO, Notice of Allowance for U.S. Appl. No. 13/427,125, Oct. 7, 2015, 7 pages.

USPTO, Notice of Allowance for U.S. Appl. No. 13/730,499, Jun. 23, 2015, 17 pages.

PCT International Search Report and Written Opinion for International Patent Application No. PCT/US2013/033438, Jun. 28, 2013, 6 pages.

Examination Report No. 1 for Australian Patent Application No. 2013205057, Nov. 14, 2014, 3 pages.

PCT International Preliminary Report on Patentability and Written Opinion for International Patent Application No. PCT/ US2013/033438, Oct. 2, 2014, 5 pages.

Examination Report No. 2 for Australian Patent Application No. 2013205057, Jan. 20, 2016, 3 pages.

IP Australia, Patent Examination Report No. 3 for Australian Patent Application No. 2013205057, Jul. 15, 2016, 3 pages.

IP Australia, Patent Examination Report No. 4 for Australian Patent Application No. 2013205057, Aug. 5, 2016, 3 pages.

* cited by examiner

SYNCHRONOUS COMMUNICATION SYSTEM AND METHOD

CROSS REFERENCE TO RELATED APPLICATION

The present application is a continuation of U.S. patent application Ser. No. 13/427,125, filed Mar. 22, 2012 and titled SYNCHRONOUS COMMUNICATION SYSTEM AND METHOD, which is incorporated herein by reference in its entirety.

TECHNICAL FIELD

This disclosure relates to object-specific, synchronous communication sessions and, more particularly, to object-specific, synchronous communication sessions that are based upon a defined affinity.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

As is known in the art, the phrase social network may be used to refer to a group of technologies (e.g. Web-based and mobile technologies) that allow for users to engage in a quasi-real-time, interactive dialogue. Social networking websites have allowed people to interact and socialize in ways that were unimaginable ten years ago. For example, the use of such social networking websites has allowed for long lost friends to be reunited, long-distance friendships to be easily maintained, and information to be broadcast to groups of people.

Included within some social networking websites is the ability for a user of the social network to publically define an affinity toward an electronic object (e.g., by associating a "like" or "+1" indicator with the object in question). For example, if a first user of the social network e.g., makes a statement, posts a photo, or identifies a restaurant, another user may publically state that they e.g., agree/disagree or like/dislike that statement, photo or restaurant.

SUMMARY OF DISCLOSURE

In a first implementation, a method for object-specific, synchronous communication executes on one or more computing devices. The method includes providing, using the one or more computing devices, a plurality of users of a social network with the ability to indicate affinity with an electronic object. An indication is received from a first user of the plurality of users to initiate an object-specific, synchronous communication session concerning the electronic object. Electronic invitations to join the object-specific, synchronous communication session are provided to one or more invited users of the plurality of users of the social network. A request is received, from at least one of the invited users, to join the object-specific, synchronous communication session. The object-specific, synchronous communication session is provided for the first user and the at least one of the invited users using the one or more computing devices.

One or more of the following features may be included. An indication of an affinity to the electronic object may be received from the first user using the one or more computing devices. Providing the object-specific, synchronous communication session for the first user and the at least one of the invited users may include rendering an audio-video stream received from one or more of the first user and the at least one of the invited users within the object-specific, synchronous communication session.

At least one of the invited users may have previously defined an affinity toward the electronic object. At least one of the invited users may be connected to the first user within the social network. The first user may be allowed to define a text-based comment concerning the electronic object. Providing electronic invitations to join the object-specific, synchronous communication session may include providing the text-based comment to the one or more invited users. The text-based comment may be used as a descriptor for the object-specific, synchronous communication session. The object-specific, synchronous communication session may be concluded upon the first user and the at least one of the invited users no longer participating in the object-specific, synchronous communication session.

In another implementation, a computer program product resides on a computer readable medium and has a plurality of instructions stored on it. When executed by a processor, the instructions cause the processor to perform operations including providing, using the one or more computing devices, a plurality of users of a social network with the ability to indicate affinity with an electronic object. An indication is received from a first user of the plurality of users to initiate an object-specific, synchronous communication session concerning the electronic object. Electronic invitations to join the object-specific, synchronous communication session are provided to one or more invited users of the plurality of users of the social network. A request is received, from at least one of the invited users, to join the object-specific, synchronous communication session. The object-specific, synchronous communication session is provided for the first user and the at least one of the invited users using the one or more computing devices.

One or more of the following features may be included. An indication of an affinity to the electronic object may be received from the first user using the one or more computing devices. Providing the object-specific, synchronous communication session for the first user and the at least one of the invited users may include rendering an audio-video stream received from one or more of the first user and the at least one of the invited users within the object-specific, synchronous communication session.

At least one of the invited users may have previously defined an affinity toward the electronic object. At least one of the invited users may be connected to the first user within the social network. The first user may be allowed to define a text-based comment concerning the electronic object. Providing electronic invitations to join the object-specific, synchronous communication session may include providing the text-based comment to the one or more invited users. The text-based comment may be used as a descriptor for the object-specific, synchronous communication session. The object-specific, synchronous communication session may be concluded upon the first user and the at least one of the invited users no longer participating in the object-specific, synchronous communication session.

In another implementation, a computing system includes at least one processor and at least one memory architecture coupled with the at least one processor. One or more software modules are executed on the at least one processor and the at least one memory architecture and perform operation including providing, using the one or more computing devices, a plurality of users of a social network with the ability to indicate affinity with an electronic object. An indication is received from a first user of the plurality of users to initiate an object-specific, synchronous communication session concerning the electronic object. Electronic invitations to join the object-specific, synchronous communication session are provided to one or more invited users of the plurality of users of the social network. A request is received, from at least one of the invited users, to join the object-specific, synchronous communication session. The object-specific, synchronous communication session is provided for the first user and the at least one of the invited users using the one or more computing devices.

One or more of the following features may be included. An indication of an affinity to the electronic object may be received from the first user using the one or more computing devices. Providing the object-specific, synchronous communication session for the first user and the at least one of the invited users may include rendering an audio-video stream received from one or more of the first user and the at least one of the invited users within the object-specific, synchronous communication session.

At least one of the invited users may have previously defined an affinity toward the electronic object. At least one of the invited users may be connected to the first user within the social network. The first user may be allowed to define a text-based comment concerning the electronic object. Providing electronic invitations to join the object-specific, synchronous communication session may include providing the text-based comment to the one or more invited users. The text-based comment may be used as a descriptor for the object-specific, synchronous communication session. The object-specific, synchronous communication session may be concluded upon the first user and the at least one of the invited users no longer participating in the object-specific, synchronous communication session.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

General:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
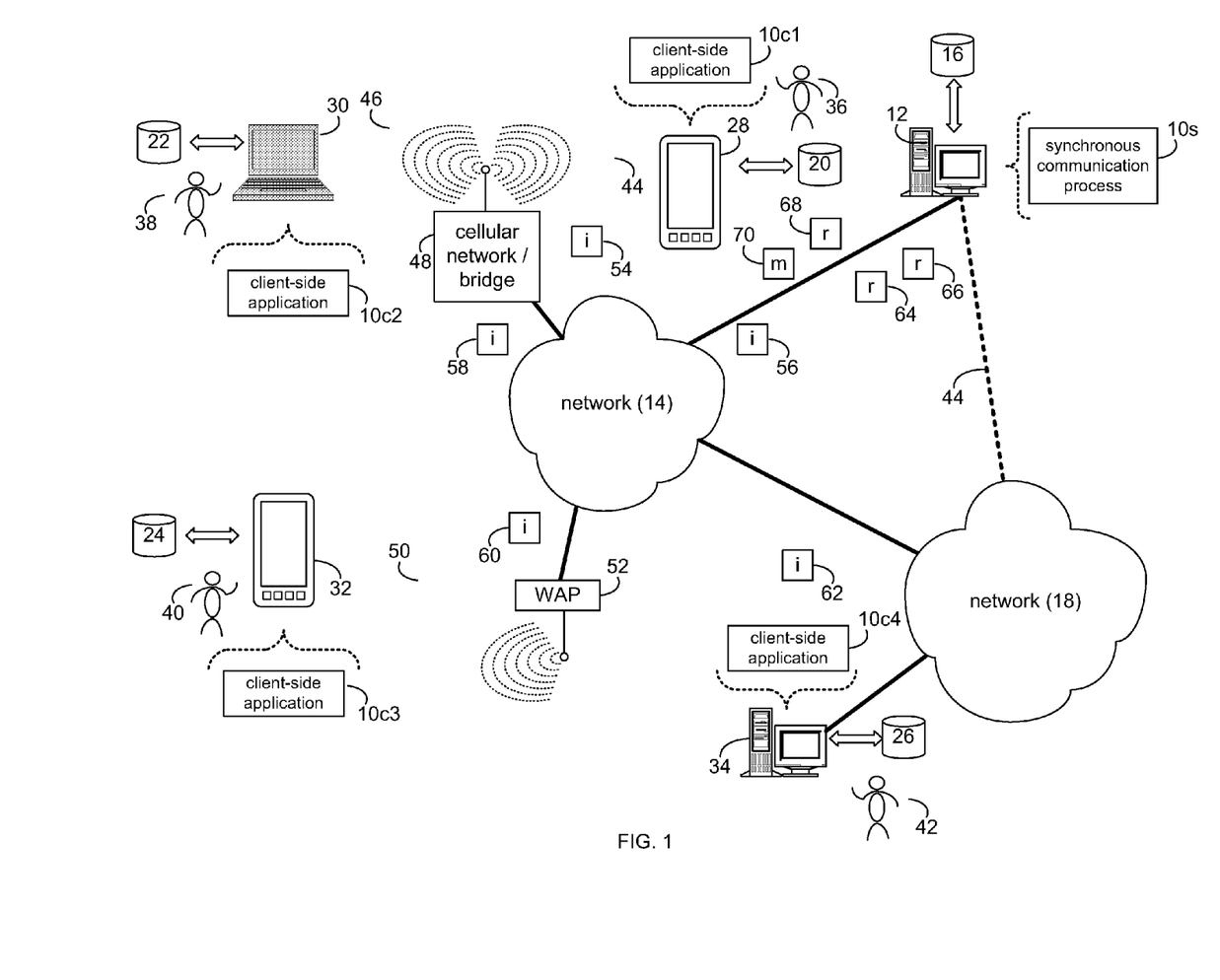
FIG. 1 is a diagrammatic view of a distributed computing network including a computing device that executes a synchronous communication process.
Figure 2:
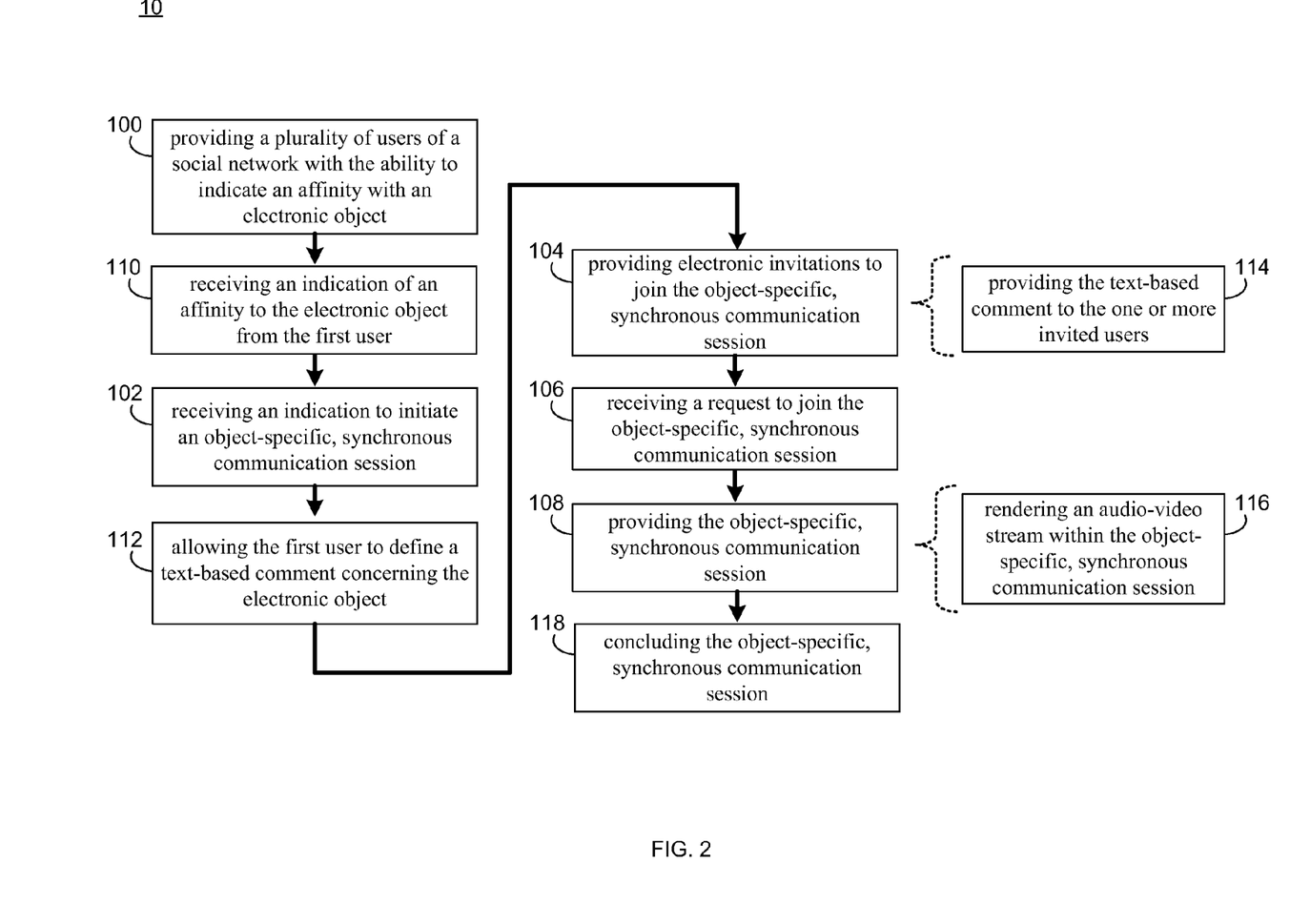
FIG. 2 is a flowchart of the synchronous communication process of FIG. 1.

System Overview:

In FIGS. 1 & 2, there is shown synchronous communication process 10. Synchronous communication process 10 may be implemented as a server-side process, a client-side process, or a hybrid server-side/client-side process. For example, synchronous communication process 10 may be implemented as a purely server-side process via synchronous communication process 10s. Alternatively, synchronous communication process 10 may be implemented as a purely client-side process via one or more of client-side application 10c1, client-side application 10c2, client-side application 10c3, and client-side application 10c4. Alternatively still, synchronous communication process 10 may be implemented as a hybrid server-side/client-side process via synchronous communication process 10s in combination with one or more of client-side application 10c1, client-side application 10c2, client-side application 10c3, and client-side application 10c4. Accordingly, synchronous communication process 10 as used in this disclosure may include any combination of synchronous communication process 10s, client-side application 10c1, client-side application 10c2, client-side application 10c3, and client-side application 10c4.

As will be discussed below in greater detail, synchronous communication process 10 may provide 100 a plurality of users of a social network with the ability to indicate an affinity with an electronic object. Synchronous communication process 10 may receive 102 an indication from a first user of the plurality of users to initiate an object-specific, synchronous communication session concerning the electronic object, and may provide 104 electronic invitations to join the object-specific, synchronous communication session to one or more invited users of the plurality of users of the social network. Synchronous communication process 10 may receive 106 a request, from at least one of the invited users, to join the object-specific, synchronous communication session, and may provide 108 the object-specific, synchronous communication session for the first user and the at least one of the invited users.

Synchronous communication process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of synchronous communication process $10_s$, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, or a specialized application (e.g., an application running on e.g., the Android™ platform and the iPhone™ platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access synchronous communication process 10 directly through network 14 or through secondary network 18. Further, synchronous communication process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Example Synchronous Communication Processes:

As discussed above, some social networking websites provide the ability for a user of the social network to publically define an affinity toward an object (e.g., by associating a "like" or "+1" indicator with the object in question). This disclosure concerns a methodology for increasing the use of such features within these social networking websites.

Specifically and as is known, the Google+™ social network includes a feature in which users of Google+™ can "+1" a particular electronic object (e.g. a URL, an article, an application, a Google defined object ID), wherein when a user+1's an object, the user is publicly announcing (e.g., within the social network) their affinity towards that object.

Further included within social networks is the ability of users of the social network to participate in-group communication sessions. For example, Google+™ allows users of this social network to participate in "hangouts", which are multiuser video chat rooms that allow for virtual gatherings of people so that they may chat about specific topics. Synchronous communication process 10 may leverage the use of Google™ "hangouts" to enhance the usability of the "+1" feature within Google+™.

Specifically and as will be discussed below in greater detail, when a user identifies an object that they wish to "+1", the user may also initiate a "hangout" concerning that specific object. For example, if a user wished to "+1" an article on a sports website concerning the 2011 World Series, the user may choose to initiate a "hangout" concerning this article. The user may also enter a text-based message concerning this article (e.g. "this is a really great article . . . let's chat about it") and may use that as an endorsement of the article and an enticement to join the "hangout". The user may identify one or more people (e.g. in the form of individual friends within Google+™, circles of friends within Google+™, and/or individual e-mail addresses) that the user may invite to participate in this "hangout". The user may also be provided with information concerning whether any of these potential invitees have previously +1'd this article. If the person being invited was already a member of Google+™, that person may simply be asked to participate in the "hangout". Alternatively, if the person being invited was not a member of Google+™, that person may first be asked to join Google+™ and, upon joining Google+™, may be asked to participate in the "hangout". As this "hangout" may be dynamically generated in response to a user's request concerning a specific entity, this hangout may be maintained until the last participant in the "hangout" leaves the "hangout", at which point it may no longer be accessible.

While the above discussion concerned Google+™, this is for illustrative purposes only and is not intended to be a limitation of this disclosure. For example, synchronous communication process 10 may be included within or utilized by any social networking website.

Figure 3:
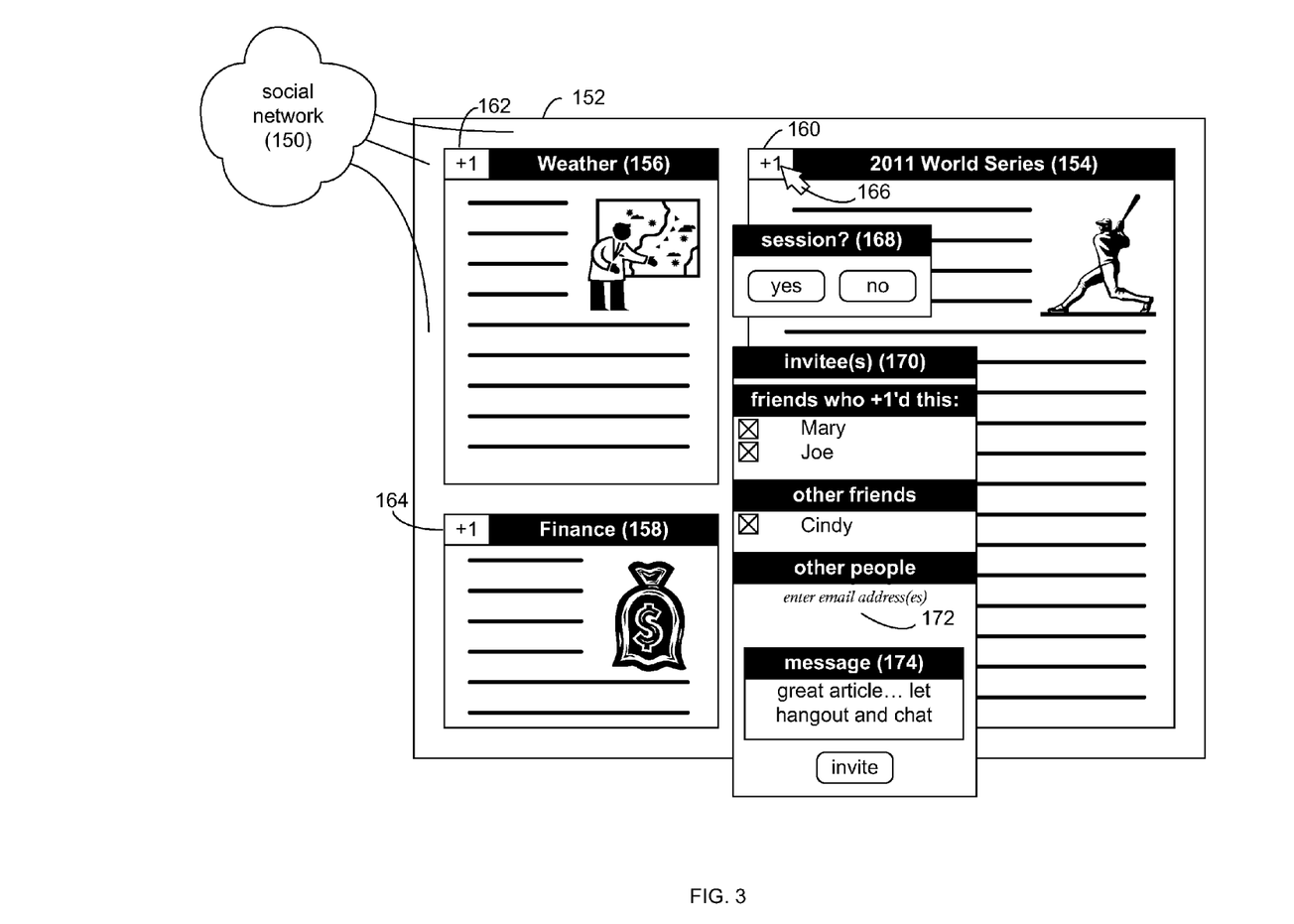
FIG. 3 is a diagrammatic view of a display screen rendered by the synchronous communication process of FIG. 1.

Referring also to FIG. 3, synchronous communication process 10 may be included within, executed within, or a portion of a social network (e.g., social network 150). As discussed above, the phrase social network may be used to refer to a group of technologies (e.g. web-based and mobile technologies) that allow for users to engage in a quasi-real-time, interactive dialogue.

Assume for illustrative purposes that user 36 (i.e. Mark) is reviewing e.g. a news website (e.g. website 152) that includes various articles (e.g. articles 154, 156, 158). Assume that article 154 (i.e. an article on the 2011 World Series) is of particular interest to user 36.

Synchronous communication process 10 may be configured to provide 100 users of social network 150 (e.g., user 36, 38, 40, 42) with the ability to indicate an affinity with an electronic object (e.g., one or more of the articles includes within website 152). For example, synchronous communication process 10 may render "+1" buttons 160, 162, 164, each of which may be associated with a particular article. For example, "+1" button 160 may be associated with article 154, "+1" button 162 may be associated with article 156, and "+1" button 164 may be associated with article 158, Accordingly and continuing with the above-stated example, assume that user 36 wishes to show an affinity to article 154 in the form of "liking" or "+1ing" the article. Accordingly, user 36 may select "+1" button 160 (which is associated with article 154) via onscreen pointer 166 (which may be controllable by a pointing device, such as a mouse (not shown)).

Upon user 36 making this selection, synchronous communication process 10 may receive 110 an indication (e.g., indication 54) that user 36 defined an affinity to this electronic object (i.e., article 154). Upon receiving 110 indication 54, synchronous communication process 10 may render session initiation window 168 that may allow users 36 to choose whether or not they wish to initiate an object-specific, synchronous communication session concerning the electronic object to which they defined an affinity (namely article 154). For example, if user 36 wishes to initiate such an object-specific, synchronous communication session, user 36 may select the "yes" button included within session initiation window 168. Alternatively, if user 36 does not wish to initiate such an object-specific, synchronous communication session, user 36 may select the "no" button included within session initiation window 168.

Figure 4:
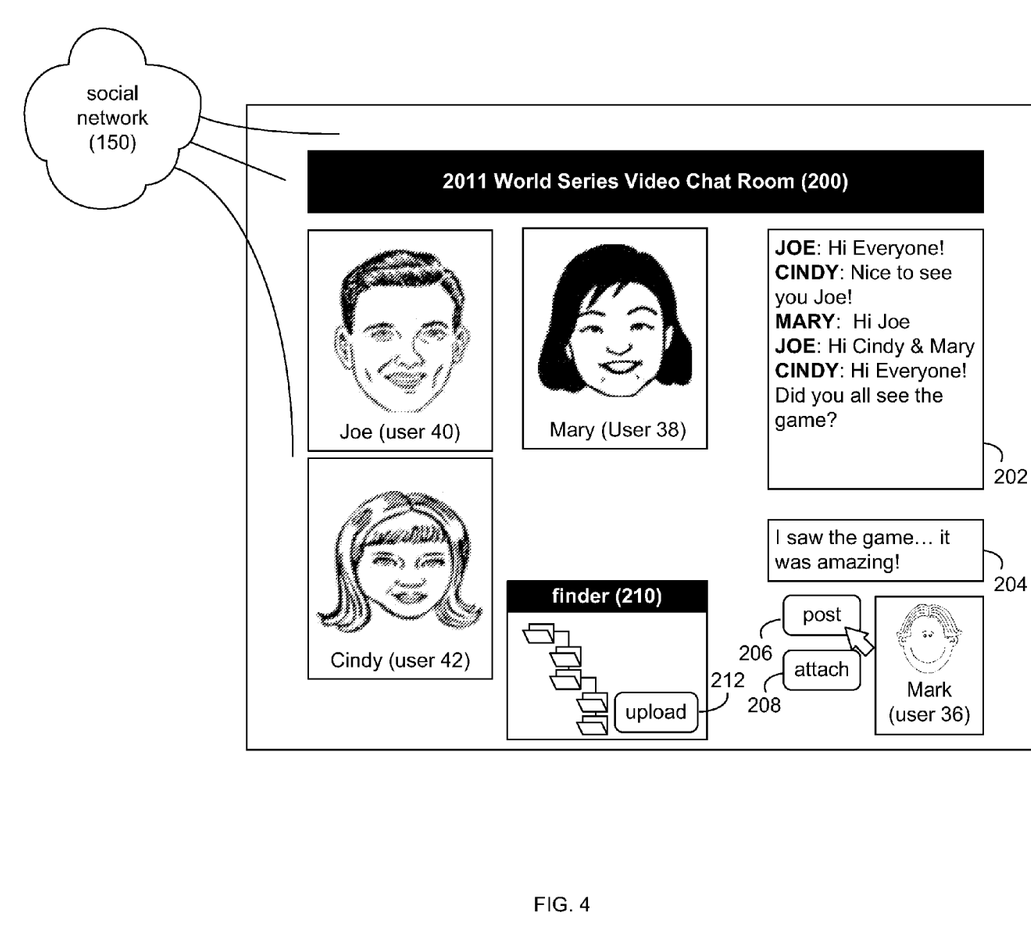
FIG. 4 is a diagrammatic view of another display screen rendered by the synchronous communication process of FIG. 1.

Referring also to FIG. 4, assume for illustrative purposes that user 36 wishes to initiate such an object-specific, synchronous communication session concerning article 154. Accordingly, user 36 may select the "yes" button included within session initiation window 168, resulting in the generation of indication 56. Upon synchronous communication process 10 receiving 102 indication 56 from user 36, synchronous communication process 10 may render invitation window 170 that may be configured to allow user 36 to identify invitee(s) for the object-specific, synchronous communication session that user 36 wishes to initiate.

Invitation window 170 may be configured to allow user 36 to invite various types of individuals to join object-specific, synchronous communication session 200 concerning article 54. For example, invitation window 170 may be configured to identify members of social network 150 that have previously defined an affinity toward the electronic object (e.g., article 54). For example, assume that Mary (i.e., user 38) and Joe (i.e., user 40) are both members of social network 150 and have both previously identified an affinity toward article 154. Accordingly, if users 38, 40 are available, they may wish to join object-specific, synchronous communication session 200.

Further, invitation window 170 may be configured to identify members of social network 150 that are connected to user 36 within social network 150 but have not previously defined an affinity toward article 54. For example, assume that Cindy (user 42) is friends with/connected to/in a circle with user 36 in social network 150. However and unlike users 38, 40, user 42 has not previously defined an affinity toward article 54.

In the event that user 36 wishes to invite any of users 38, 40, 42 to join object-specific, synchronous communication session 200, user 36 may check the appropriate check box next to the name of the user(s) that they wish to invite.

Additionally, invitation window 170 may be configured to allow user 36 to invite people that are not members of social network 150. Accordingly, user 36 may populate email field 172 with the email address(es) of people that that they wish to invite to join object-specific, synchronous communication session 200 but are currently not members of social network 150.

Invitation window 170 may include message field 174 that may allow 112 user 36 to define a text-based comment concerning the electronic object (i.e., article 154). For example, user 36 may add the comment "great article . . . let's hangout and chat" concerning article 154. Accordingly, the text-based comment may be used as a descriptor for object-specific, synchronous communication session 200.

Once the appropriate people are identified within invitation window 170 (thus defining a group of invited users), user 36 may select (via onscreen pointer 166) the "invite" button included within invitation window 170 and synchronous communication process 10 may provide 104 to the invited users electronic invitations to join object-specific, synchronous communication session 200. For example, synchronous communication process 10 may provide invitations 58, 60, 62 to users 38, 40, 42 (respectively). When providing 104 invitations 58, 60, 62 to users 38, 40, 42, synchronous communication process 10 may also provide 114 the above-described text-based comment concerning article 154 within invitations 58, 60, 62.

If the person being invited to join object-specific, synchronous communication session 200 was not a member of social network 150, that person may first be asked to join social network 150 and, upon joining social network 150, may be asked to participate in object-specific, synchronous communication session 200.

While the following discussion concerns object-specific, synchronous communication session 200 being an audio-video, object-specific, synchronous communication session, this is for illustrative purposes only and is not intended to be a limitation of this disclosure, as other configurations are possible (e.g., a multi-user, audio-only chat room) and are considered to be within the scope of this disclosure.

Upon receiving invitations 58, 60, 62, users 38, 40, 42 may either accept or reject the same. Assume for illustrative purposes that each of users 38, 40, 42 accepts their invitation to join object-specific, synchronous communication session 200. Upon a user accepting one of the above-described invitations, a corresponding request (e.g., requests 64, 66, 68) to join object-specific, synchronous communication session 200 may be provided to synchronous communication process 10.

Accordingly, upon synchronous communication process 10 receiving 106 request 64, 66, 68 from e.g., users 38, 40, 42 (respectively), synchronous communication process 10 may provide 108 object-specific, synchronous communication session 200 for the user initiating object-specific, synchronous communication session 200 (e.g., user 36) and the user(s) who accepted the invitation (users 38, 40, 42).

As discussed above, object-specific, synchronous communication session 200 may be an audio-video, object-specific, synchronous communication session. Accordingly, when providing 108 object-specific, synchronous communication session 200 to users, 36, 38, 40, 42, synchronous communication process 10 may render 116 an audio-video stream (e.g., generated by a webcam/microphone included within client electronic devices 28, 30, 32, 34 (respectively)) received from e.g., users 36, 38, 40, 42 within object-specific, synchronous communication session 200.

Once the object-specific, synchronous communication session 200 is initiated by social network 150, users 36, 38, 40, 42 may be permitted to participate within object-specific, synchronous communication session 200. For example and as discussed above, users 36, 38, 40, 42 may be allowed to provide an audio-video stream to object-specific, synchronous communication session 200, so that the participating users may "appear" as an audio-video stream within object-specific, synchronous communication session 200.

In addition to the above-described audio & video based communication, synchronous communication process 10 may be configured to render text-based chat window 202 within object-specific, synchronous communication session 200, thus enabling text-based participation within object-specific, synchronous communication session 200. For example, object-specific, synchronous communication session 200 may be configured to allow user 36 to post a text-based message within text-based chat window 202. Accordingly user 36 may compose their message (e.g., "I saw the game . . . it was amazing!") within message composition window 204 and select "post" button 206, resulting in the generation of text-based message 70, which may be provided to synchronous communication process 10. Upon receiving text-based message 70 from user 36, synchronous communication process 10 may render text-based message 70 within text-based chat window 202 of object-specific, synchronous communication session 200.

Additionally/alternatively, synchronous communication process 10 may be configured to allow user 36 to upload files (e.g., photographs, video recordings, audio recordings) that are owned by user 36 to the object-specific, synchronous communication session 200. For example, if user 36 was at one of the games of the 2011 World Series and took a picture of an amazing play at home plate, user 36 may upload that photograph to object-specific, synchronous communication session 200, thus allowing user 36 to share that photograph with e.g., users 38, 40, 42. Accordingly, user 36 may select "attach" button 208, which may render finder window 210 that may allow user 36 to select the appropriate file for upload. Once the appropriate file is selected, user 36 may select "upload" button 212, resulting in the selected file being uploaded by synchronous communication process 10 and made available within object-specific, synchronous communication session 200.

As object-specific, synchronous communication session 200 is not a persistent communication session, a minimum number of participants may be required for object-specific, synchronous communication session 200 to be maintained. Accordingly, synchronous communication process 10 may conclude 118 object-specific, synchronous communication session 200 upon all of users 36, 38, 40, 42 no longer participating in object-specific, synchronous communication session 200.

Synchronous communication process 10 may be configured to allow the various users of social network 150 to opt in/out of the various aspects of object-specific, synchronous communication session 200. For example, synchronous communication process 10 may be configured so that a user cannot be invited to join object-specific, synchronous communication session 200 unless e.g., they proactively choose to allow all invitations or they are connected to the inviting user. Additionally, a user of social network 150 may configure synchronous communication process 10 so that the above-described service (i.e., being able to initiate object-specific, synchronous communication session 200 based upon defining an affinity) is not provided to the user.

Additional Example Embodiments

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A method for object-specific, synchronous communication, executing on one or more computing devices, the method comprising:
   providing, using the one or more computing devices, a plurality of users of a social network with the ability to indicate affinity with an electronic object displayed on a website that is separate from the social network by selection of a button that is associated with the electronic object;
   receiving, using the one or more computing devices, an indication of affinity to the electronic object from a first user from the plurality of users;
   receiving an initiation request from the first user of the plurality of users to initiate an object-specific, synchronous communication session concerning the electronic object;
   providing electronic invitations to join the object-specific, synchronous communication session to one or more invited users;
   receiving a join request, from at least one of the invited users, to join the object-specific, synchronous communication session; and
   providing, using the one or more computing devices, the object-specific, synchronous communication session for the first user and the at least one of the invited users.

2. The method of claim 1, wherein the first user is connected to the invited users within the social network, the method further comprising:
   providing the first user with information about the plurality of users including a first list of a group of users that provided the indication of affinity to the electronic object and a second list of remaining users from the plurality of users that did not provide the indication of affinity to the electronic object.

3. The method of claim 1, wherein the initiation request from the first user of the plurality of users includes a group of users from the plurality of users to invite to the object-specific, synchronous communication session.

4. The method of claim 1, further comprising:
   responsive to receiving the indication of affinity to the electronic object, causing a user device associated with the first user to display a session initiation window that provides the first user with an option to initiate the object-specific, synchronous communication session; and wherein the initiation request from the first user is received based on providing the option to initiate the object-specific, synchronous communication session.

5. The method of claim 4, further comprising:
responsive to receiving the initiation request from the first user, causing the user device associated with the first user to display an invitation window that enables the first user to identify invited users to invite to join the object-specific, synchronous communication session.

6. The method of claim 5, wherein:
the invitation window includes an email field that enables the first user to provide one or more email addresses of people to invite to join the object-specific, synchronous communication session; and
the people are not members of the social network.

7. The method of claim 1, further comprising:
providing the first user with information about the plurality of users including a first list of a group of users that provided the indication of affinity to the electronic object and a second list of remaining users from the plurality of users that are connected to the first user and that did not provide the indication of affinity to the electronic object.

8. A computer program product residing on a non-transitory computer readable medium having a plurality of instructions stored thereon which, when executed by a processor, cause the processor to perform operations comprising:
providing a plurality of users of a social network with the ability to indicate affinity with an electronic object displayed on a website that is separate from the social network by selection of a button that is associated with the electronic object;
receiving an indication of affinity to the electronic object from a first user from the plurality of users;
receiving, an initiation request from the first user of the plurality of users to initiate an object-specific, synchronous communication session concerning the electronic object;
providing electronic invitations to join the object-specific, synchronous communication session to one or more invited users;
receiving a join request, from at least one of the invited users, to join the object-specific, synchronous communication session; and
providing the object-specific, synchronous communication session for the first user and the at least one of the invited users.

9. The computer program product of claim 8, wherein the first user is connected to the invited users within the social network, the operations further comprising:
providing the first user with information about the plurality of users including a first list of a group of users that provided the indication of affinity to the electronic object and a second list of remaining users from the plurality of users that did not provide the indication of affinity to the electronic object.

10. The computer program product of claim 8, wherein the initiation request from the first user of the plurality of users includes a group of users from the plurality of users to invite to the object-specific, synchronous communication session.

11. The computer program product of claim 8, the operations further comprising:
responsive to receiving the indication of affinity to the electronic object, causing a user device associated with the first user to display a session initiation window that provides the first user with an option to initiate the object-specific, synchronous communication session; and
wherein the initiation request from the first user is received based on providing the option to initiate the object-specific, synchronous communication session.

12. The computer program product of claim 11, the operations further comprising:
responsive to receiving the initiation request from the first user, causing the user device associated with the first user to display an invitation window that enables the first user to identify invited users to invite to join the object-specific, synchronous communication session.

13. The computer program product of claim 12, wherein:
the invitation window includes an email field that enables the first user to provide one or more email addresses of people to invite to join the object-specific, synchronous communication session; and
the people are not members of the social network.

14. The computer program product of claim 8, the operations further comprising:
providing the first user with information about the plurality of users including a first list of a group of users that provided the indication of affinity to the electronic object and a second list of remaining users from the plurality of users that are connected to the first user and that did not provide the indication of affinity to the electronic object.

15. A computing system comprising: at least one processor; at least one memory architecture coupled with the at least one processor; one or more software modules executed on the at least one processor and the at least one memory architecture, wherein the one or more software modules are configured to perform operations including:
providing a plurality of users of a social network with the ability to indicate affinity with an electronic object displayed on a website that is separate from the social network by selection of a button that is associated with the electronic object;
receiving an indication of affinity to the electronic object from a first user from the plurality of users;
receiving, an initiation request from the first user of the plurality of users to initiate an object-specific, synchronous communication session concerning the electronic object;
providing electronic invitations to join the object-specific, synchronous communication session to one or more invited users;
receiving a join request, from at least one of the invited users, to join the object-specific, synchronous communication session; and
providing the object-specific, synchronous communication session for the first user and the at least one of the invited users.

16. The computing system of claim 15, wherein the one or more software modules are further configured to perform operations comprising:
providing the first user with information about the plurality of users including a first list of a group of users that provided the indication of affinity to the electronic object and a second list of remaining users from the plurality of users that did not provide the indication of affinity to the electronic object.

17. The computing system of claim 14, wherein the initiation request from the first user of the plurality of users includes a group of users from the plurality of users to invite to the object-specific, synchronous communication session.

18. The computing system of claim 14, wherein the one or more software modules are further configured to perform operations comprising:
   responsive to receiving the indication of affinity to the electronic object, causing a user device associated with the first user to display a session initiation window that provides the first user with an option to initiate the object-specific, synchronous communication session; and
   wherein the initiation request from the first user is received based on providing the option to initiate the object-specific, synchronous communication session.

19. The computing system of claim 18, wherein the one or more software modules are further configured to perform operations comprising:
   responsive to receiving the initiation request from the first user, causing the user device associated with the first user to display an invitation window that enables the first user to identify invited users to invite to join the object-specific, synchronous communication session.

20. The computing system of claim 19, wherein:
   the invitation window includes an email field that enables the first user to provide one or more email addresses of people to invite to join the object-specific, synchronous communication session; and
   the people are not members of the social network.

* * * * *